United States Patent
Shingai et al.

(10) Patent No.: US 10,427,251 B2
(45) Date of Patent: Oct. 1, 2019

(54) FINE SILVER PARTICLE DISPERSION, FINE SILVER PARTICLES, AND METHOD FOR PRODUCING SAME

(71) Applicant: BANDO CHEMICAL INDUSTRIES, LTD., Kobe-shi, Hyogo (JP)

(72) Inventors: Yuki Shingai, Kobe (JP); Takuya Tomura, Kobe (JP)

(73) Assignee: BANDO CHEMICAL INDUSTRIES, LTD., Kobe-shi, Hyogo (JP)

( * ) Notice: Subject to any disclaimer, the term of this patent is extended or adjusted under 35 U.S.C. 154(b) by 284 days.

(21) Appl. No.: 15/317,157

(22) PCT Filed: Jun. 4, 2015

(86) PCT No.: PCT/JP2015/002822
§ 371 (c)(1),
(2) Date: Dec. 8, 2016

(87) PCT Pub. No.: WO2015/190076
PCT Pub. Date: Dec. 17, 2015

(65) Prior Publication Data
US 2017/0120394 A1    May 4, 2017

(30) Foreign Application Priority Data

Jun. 11, 2014   (JP) .................................. 2014-120398
Nov. 25, 2014   (JP) .................................. 2014-238100

(51) Int. Cl.
| | | |
|---|---|---|
| *B23K 35/30* | (2006.01) | |
| *B22F 9/24* | (2006.01) | |
| *C09D 17/00* | (2006.01) | |
| *H01B 1/22* | (2006.01) | |
| *H01B 13/00* | (2006.01) | |
| *B22F 1/00* | (2006.01) | |
| *B23K 35/02* | (2006.01) | |

(52) U.S. Cl.
CPC ........ *B23K 35/3006* (2013.01); *B22F 1/0018* (2013.01); *B22F 1/0022* (2013.01); *B22F 1/0062* (2013.01); *B22F 1/0074* (2013.01); *B22F 9/24* (2013.01); *B23K 35/025* (2013.01); *C09D 17/00* (2013.01); *H01B 1/22* (2013.01); *H01B 13/00* (2013.01); *B22F 2001/0066* (2013.01); *B22F 2009/245* (2013.01); *B22F 2301/255* (2013.01); *B22F 2302/45* (2013.01); *B22F 2303/01* (2013.01); *B22F 2304/054* (2013.01); *B22F 2304/056* (2013.01); *B22F 2998/10* (2013.01)

(58) Field of Classification Search
CPC . B23K 35/3006; B23K 35/025; B22F 1/0018; B22F 1/0022; B22F 1/0062; B22F 1/0074; B22F 9/24; C09D 17/006; C09D 17/002
See application file for complete search history.

(56) References Cited

U.S. PATENT DOCUMENTS

2014/0346412 A1   11/2014   Okamoto et al.

FOREIGN PATENT DOCUMENTS

| | | |
|---|---|---|
| EP | 2156911 A1 | 2/2010 |
| EP | 2671655 A1 | 12/2013 |
| JP | 2004-107728 A | 4/2004 |
| JP | 2011-94223 A | 5/2011 |
| JP | 2013-142173 A | 7/2013 |
| JP | 2013-185213 A | 9/2013 |
| JP | 2014-31542 A | 2/2014 |
| WO | 2013/099818 A1 | 7/2013 |
| WO | WO 2013/099818 * | 7/2013 |

OTHER PUBLICATIONS

Translation of WO 2013/099818 (JP 2013/139589 is the Japanese national stage application for WO 2013/099818)—Jul. 4, 2013.*
International Search Report dated Aug. 11, 2015, issued in counterpart International Application No. PCT/JP2015/002822 (1 page).

* cited by examiner

*Primary Examiner* — C Melissa Koslow
(74) *Attorney, Agent, or Firm* — Westerman, Hattori, Daniels & Adrian, LLP

(57) ABSTRACT

Provided are a fine silver particle dispersion which exhibits low temperature sinterability and in which fine silver particles are uniformly dispersed in a variety of solvents (and especially highly polar solvents); fine silver particles that exhibit low temperature sinterability and excellent dispersion stability in a variety of solvents (and especially highly polar solvents); a dispersion obtained using the fine silver particles; and a method for producing same. The fine silver particle dispersion is characterized by containing fine silver particles, a short chain amine having 5 or fewer carbon atoms, and a highly polar solvent and in that the partition coefficient (log P) of the short chain amine is −1.0 to 1.4.

14 Claims, No Drawings

FINE SILVER PARTICLE DISPERSION, FINE SILVER PARTICLES, AND METHOD FOR PRODUCING SAME

TECHNICAL FIELD

The present invention relates to a fine silver particle dispersion that fine silver particles are dispersed in various solvent and can be used widely as an electrically conductive ink to form wiring and an electrode pattern of semiconductor integrated circuit and the like, and as a composition for bonding which can bond electronic parts at a low temperature, fine silver particle which can be dispersed in various solvents, and a method for producing the fine silver particle.

BACKGROUND ARTS

Recently, an electrically conductive ink where low temperature sinterability of fine a metal particle, particularly a fine silver particle (for example, Patent Literature 1 (Japanese Patent Laid-Open Application 2013-185213)), and a composition for bonding (for example, Patent Literature 2 (Japanese Patent Laid-Open Application 2004-107728)) have been paid attention.

Accompanying the above matters, the fine silver particles used for the aforementioned objects have been intensively developed, and various fine silver particles and methods thereof have been proposed. For example, in Patent Literature 3 (Japanese Patent Laid-Open Application 2013-142173), there is proposed a method for producing a silver nanoparticle which comprises: preparing an amine mixed liquid that contains an aliphatic hydrocarbon mono-amine (A) having an aliphatic hydrocarbon group and one amino group wherein the aliphatic hydrocarbon group has a total carbon atom of 6 or more, and an aliphatic hydrocarbon mono-amine (B) having an aliphatic hydrocarbon group and one amino group wherein the aliphatic hydrocarbon group has a total carbon atom of 5 or less, and a content of the amine (A) is 5% by mole or more and less than 20% by mole and a content of the amine (B) is more than 80% by mole and 95% by mole or less on the bases of the total moles of the amine (A) and the amine (B); mixing a silver compound and the amine mixed liquid to yield a complex compound containing the silver compound and the amine; and then thermally decomposing the complex compound to form a silver nanoparticle.

According to the producing method of the silver nanoparticle of the above Patent Literature 3, when using the amine mixed liquid containing the aliphatic hydrocarbon mono-amine (A) having 6 or more carbon atoms and the aliphatic hydrocarbon mono-amine (B) having 5 or less carbon atoms, appropriate stabilization of the silver nanoparticle can be obtained.

Further, in Patent Literature 4 (Japanese Patent Laid-Open Application 2014-31542), there is proposed a method for producing a fine silver particle characterized by a first step for mixing a silver compound which can yield a metal silver by thermal decomposition, an alkylamine, at least one alcoholic compound having a solubility to water to yield a complex compound containing the silver compound and the alkylamine, and a second step for thermally decomposing the complex compound to yield a fine silver particle which is covered with a protective film containing the alkylamine.

Though, when using only an alkylamine as the covering molecule for the fine silver particle, it is difficult to yield the complex compound and it takes a long period of time for forming the complex compound, in the method for producing the fine silver particle of the above Patent Literature 4, by adding the alcoholic compound having a solubility to water at the time when the complex compound is prepared by mixing the silver compound which can yield a metal silver by thermal decomposition and the alkylamine, the preparation of the complex compound is accelerated to be able to yield the complex compound efficiently regardless the kind of the alkylamine.

PRIOR ART LITERATURE

Patent Literature

Patent Literature 1: Japanese Patent Laid-Open Application 2013-185213
Patent Literature 2: Japanese Patent Laid-Open Application 2004-107728
Patent Literature 3: Japanese Patent Laid-Open Application 2013-142173
Patent Literature 4: Japanese Patent Laid-Open Application 2014-31542

SUMMARY OF INVENTION

Problem to be Solved by the Invention

However, in the producing method of the silver nanoparticle of the above Patent Literature 3, since the co-use of the amine having 6 or more carbon atoms and the amine having 5 or less carbon atoms is essential for the dispersing property of the silver nanoparticles and the formation of the complex compound, there is a problem that the presence of the long- or medium-chain amine of a high boiling point component having a low polarity makes the dispersion property to a polar solvent worse.

In the method for producing the fine silver particle of the above Patent Literature 4, since the addition of the low molecular weight organic compound such as an alcohol is essential in order to accelerate the formation of the complex, there is a problem that the obtained fine silver particle can be dispersed well in a solvent having a low polarity which contains mainly octane, but has inferior dispersing property to a high polar solvent.

Considering the above circumstances, the objects of the present invention are to provide a fine silver particle dispersion having a low temperature sinterability where fine silver particles are dispersed uniformly to various solvents (particularly a high polar solvent), a fine silver particle having an excellent dispersing property to various solvents (particularly a high polar solvent) and also a low temperature sinterability, and a method for producing the fine silver particle.

Means for Solving the Problem

In order to realize the above objects, the present inventor has been studied intensively as to the kind of amines and the like to be adhered on at least a part of the surface of the fine silver particle, and has found that when optimizing a partition coefficient and the like of the amine, the objects can be realized effectively, and then has completed the present invention.

Namely, according to the first invention of the present invention, there is provided a fine silver particle dispersion, which comprises fine silver particles,
a short chain amine having 5 or less carbon atoms and
a highly polar solvent, and
a partition coefficient log P of the short chain amine is −1.0 to 1.4.

The amino group in one molecule of the amine has a relatively high polarity and is easy to get an interaction by the hydrogen bond, but the remaining part other than the functional groups has a relatively low polarity. Further, when the amine is localized (attached) to at least a port of the surface of the fine silver particle in the fine silver particle dispersion of the present invention (in other words, when at least a port of the surface of the fine silver particle is covered), the solvent and the fine silver particle can cause sufficient affinity, and the fine silver particles can be prevented from agglomeration with each other (improve the dispersing property). Namely, since the amine is adsorbed via the functional group on the surface of the fine silver particle in an appropriate strength to block the contact of fine silver particles with each other, the amine contributes the stability of the fine silver particles in the reservation state. In addition, by heating, the amine moves or evaporates from the surface of the fine silver particle, the fusion of the fine silver particles to each other can be accelerated.

When the amine which constitutes the fine silver particle dispersion of the present invention is the short chain amine having 5 or less carbon atoms, the amine adhered on at least a part of the surface of the fine silver particles can be easily removed by heating to ensure the good low temperature sinterability (for example a sinterability at 100 to 350° C.) of the fine silver particle.

The reason why the partition coefficient log P is set within the range of from −1.0 to 1.4, when the partition coefficient log P is −1.0 or less, since the polarity of the short chain amine is too high to proceed the reduction of the silver, it is difficult to control the yield of the fine silver particle, and when the partition coefficient log P is 1.5 or more, since the polarity of the amine which coordinates with the silver, it is difficult to disperse in the high polar solvent.

In the present invention, the partition coefficient log P means an octanol/water partition coefficient where n-octanol and water are used as the solvents, and a concentration Co in the octanol and a concentration Cw in water are measured, respectively, and then the partition coefficient is obtained by calculating a common logarithm log P from the concentration ratio P=Co/Cw. Therefore, the partition coefficient log P means one index which represents a possibility whether the fine silver particles can be dispersed in what range of polar solvent. A method for measuring the partition coefficient log P is not particularly limited, and the partition coefficient can be determined by flask shaking method, a high performance chromatography (HPLC), and a calculation by using a quantitative structure activity algorithm, or the like, and preferable is to use a value of literature disclosed in the web site of National Center for Biotechnology Information, and the like.

It is preferable that the fine silver particle dispersion of the present invention further contains the dispersant having an acid value in order to disperse the fine silver particles. Here, the "dispersant having an acid value" includes all of the dispersants other than dispersants which do not have an amine value and a hydroxyl value as an adsorbing group or a functional group. By using the dispersant, the dispersing stability of the fine silver particles in the solvent can be improved. Here, the acid value of the dispersant is preferably 5 to 200, and further preferably the dispersant has a functional group derived from a phosphoric acid. The reason why the "dispersant having an acid value" is preferable is not exactly clear, the present inventors assume that the dispersant can adsorb in dense manner by not only the adsorption action to the metal but also the interaction with the short chain amine, and as the result, it is possible to exhibit a high dispersing property while maintaining a low temperature sinterability.

When the acid value of the dispersant is 5 or more, the dispersant begins to adsorb to the metal substance where the amine is coordinated to make the surface basic through acid-basic interaction, and when being 200 or less, since there is not excess amount of adsorption sites so as to be adsorbed in the suitable manner. Further, when the dispersant has the functional group derived from a phosphoric acid, since phosphor P and oxygen O pull with each other through a metal M, it is most effective for the adsorption of a metal or a metal compound, and thus, the suitable dispersing property can be obtained by the minimum adsorption amount.

Here, the acid value is represented by a numeral of mg of potassium hydroxide required for neutralizing an acidic component contained in 1 g of the sample. The acid value can be measured by an indicator method (p-naphtholbenzein indicator) or a potentiometric titration method.

ISO6618-1997: Testing method for neutralization value by the indicator titration method→Corresponding to the indicator titration method (acid value)

ISO6619-1988: Potentiometric titration method (acid value)→Corresponding to the potentiometric titration method (acid value)

Further, in the fine silver particle dispersion of the present invention, various solvent, particularly a high polar solvent is used as the solvent. The high polar solvent generally means a solvent such as water or an alcohol having a short carbon atoms which is not compatible with a low polar solvent such as hexane or toluene, and according to the present invention, more preferable is an alcohol having 1 to 6 carbon atoms. By using the alcohol having 1 to 6 carbon atoms as the high polar solvent, it is possible to avoid a trouble when using the low polar solvent that, for example, the solvent deteriorates an under layer made of a resin at the time when the fine silver particle dispersion is laminated on a resin. Here, it is preferable to use an alkoxyamine as the amine. When using the alkoxyamine as the amine, the fine silver particles can be dispersed well in the high polar solvent. More specifically, the high polar solvent is preferably methanol, ethanol, isopropyl alcohol or n-propyl alcohol.

The particle size of the fine silver particle which constitutes the fine silver particle dispersion of the present embodiment is a nanometer size where the lowering of a melting point is caused, desirably 1 to 200 nm, and as occasion demand, particles having a micrometer size may be contained.

The fine silver particle dispersion of the present embodiment further may contain a dispersant having an acid value (protective dispersant) as a protective agent added before the synthesis of the fine silver particle. Here, the "protective dispersant" may be the same kind as the aforementioned "dispersant having an acid value" which is added after the synthesis of the fine silver particle.

Further, according to the second invention of the present invention, there is provided a fine silver particle, which comprises
an alkoxyamine having 5 or less carbon atoms which is adhered to at least a part of the surface of the particle, and a partition coefficient log P of the alkoxyamine is −1.0 to 1.4.

When the alkoxyamine having 5 or less carbon atoms and having a partition coefficient log P of −1.0 to 1.4 is adhered on at least a part of the surface of the fine silver particle, it is possible to endow the fine silver particle with the excellent dispersing property with respect to various solvents (particularly the high polar solvent) and the low temperature sinterability.

The particle size of the fine silver particle of the present invention which can be dispersed in the high polar solvent is a nanometer size where the lowering of a melting point is caused, desirably 1 to 200 nm, and as occasion demand, particles having a micrometer size may be contained.

Further, according to the third invention of the present invention, there is provided a composition for bonding which comprises the fine silver particles of the present invention. When containing the fine silver particles of the present invention, good bonding parts can be formed even at a low bonding temperature.

Further, the present invention provides a method for producing a fine silver particle, which comprises a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

According to the method for producing the fine silver particle of the present invention, it is preferable that the method includes a step for adding and mixing a dispersant having an acid value for dispersing the fine silver particles.

Further, according to the method for producing the fine silver particle of the present invention, in the first step, it is preferable that the short chain amine is added in an amount of 2 mol or more relative to 1 mol of the metal silver. When the short chain amine is added in an amount of 2 mol or more relative to 1 mol of the metal silver, the short chain amine can be adhered in an appropriate amount on the surface of the fine silver particle obtained by the reduction, and thus it is possible to endow the fine silver particle with the excellent dispersing property with respect to various solvents (particularly the high polar solvent) and the low temperature sinterability. There is no upper limit as to the amount to be added in order to yield the fine silver particle, it is not preferable that the short chain amine is added in an excess amount from the viewpoint of cost performance due to the high material cost. Therefore it is preferable the molar ratio is 30 or less relative to the silver.

According to the method for producing the fine silver particle of the present invention, by controlling the formulations of the mixed liquid in the first step and the reduction conditions (for example, heating temperature, heating time, etc.) in the second step, it is preferable that the particle size of the fine silver particle is a nanometer size where the melting point is lowered, and more preferably 1 to 200 nm. Here, as occasion demand, particles having a micrometer side may be contained.

Effect of the Invention

The present invention can provide a fine silver particle dispersion having a low temperature sinterability where fine silver particles are dispersed uniformly to various solvents (particularly a high polar solvent), a fine silver particle having an excellent dispersing property to various solvents (particularly a high polar solvent), and a low temperature sinterability, and a method for producing the fine silver particle. Further, the present invention can also provide a composition for bonding which contains the above fine silver particle dispersion or the above fine silver particles.

Embodiments for Solving the Problem

Hereafter, preferred embodiments of the fine silver dispersion, the fine silver particle, and the method for producing thereof of the present invention will be explained in detail. Furthermore, the explanation hereafter merely mentions one embodiment of the present invention, but the present invention shall not be limited because of these, and any redundant explanation may be omitted.

(1) Fine Silver Particle Dispersion

The fine silver particle dispersion of the present embodiment includes the fine silver particles, the short chain amine having 5 or less carbon atoms, and the high polar solvent. In the following, these components are explained.

(1-1) Fine Silver Particle

An average particle size of the fine silver particles in the fine silver particle dispersion of the present embodiment is not particularly limited as long as being within the scope that will not impair the effects of the present invention, and is preferable to have an average particle size so as to cause lowering of the melting point, and for example, and may be 1 to 200 nm. In addition, further preferable is 2 to 100 nm. When the average particle size of the fine silver particles is 1 nm or more, the fine silver particle is endowed with good low temperature sinterability, and it is useful because the cost to manufacture the metal particles will not be high. Further, when being 200 nm or less, the dispersing property of the fine silver particles is not easily changed with lapse of time.

When using the fine silver particle dispersion, for example, as material of the composition for bonding, considering a problem of migration, a metal where the ionization column is nobler than hydrogen, i.e., gold, copper, platinum and palladium may be added.

The particle size of the fine silver particles in the fine silver particle dispersion of the present embodiment may not be uniform. Further, in case that the fine silver particle dispersion contains a dispersion medium and the like mentioned after as an optional component, though there is a case that metal particle components having an average size of more than 200 nm, the metal particle component having an average particle size of more than 200 nm may be contained, as long as the components do not cause agglomeration or does not remarkably impair the effects of the present invention.

Here, the particle size of the fine silver particles in the fine silver particle dispersion of the present embodiment can be measured by dynamic light scattering, small angle X-ray scattering or a wide-angle X-ray diffraction method. In order to show lowering of the melting point of nanosize fine silver particles, a crystallite diameter that is obtained by the wide-angle X-ray diffraction method is appropriate. For example, in the wide-angle X-ray diffraction method, more specifically, the crystallite diameter can be measured within a range of 30° to 80° of 2θ by the diffraction method, using RINT-Ultima III available from by Rigaku Corporation. In this case, a sample is rolled thinly so as to flatten a surface over a glass plate with approximately 0.1 to 1 mm of recess in the center part. Further, the crystallite diameter (D) that is calculated by assigning a half-value width of the obtained diffraction spectrum to the following Scherrer's equation by using JADE available from Rigaku Corporation is assumed to be the particle size:

$$D=K\lambda/B \cos\theta$$

Herein, K represents Scherrer constant (0.9), λ represents a wavelength of X-ray, B represents a half-value width of diffraction line, and θ represents Bragg angle.

(1-2) Short Chain Amine Having 5 or Less Carbon Atoms

In the fine silver particle dispersion of the present embodiment, the short chain amine having 5 or less of carbon atoms is attached to at least a port of the surface of the fine silver particle. On the surface of the fine silver particle, there may be adhered a slight amount of organic substances such as a slight amount of an organic substance which is contained initially as organic impurities, a slight amount of an organic substance which is contaminated in the producing processes mentioned after, a residual reducing agent and a residual dispersant which cannot be removed in the washing process.

The short chain amine having 5 or less carbon atoms is not particularly limited as long as the partition coefficient log P is −1.0 to 1.4, and may be linear or branched, and may have a side chain. Examples of the short chain amine include ethylamine (−0.3), propylamine (0.5), butylamine (1.0), 2-methoxyethylamine (−0.9), 3-methoxypropylamine (−0.5), 3-ethoxypropylamine (−0.1), 1,4-butanediamine (−0.9), 1,5-pentanediamine (−0.6), pentanolamine (−0.3), aminoisobutanol (−0.8), and the like, and is preferable is an alkoxyamine.

The above amine may be a compound containing a functional group other than amine, such as hydroxyl group, carboxyl group, an alkoxy group, carbonyl group, an ester group or mercapto group. Further, the amine may be used alone or in combination of two or more. In addition, it is preferable that a boiling point under normal pressure is preferably 300° C. or less, further preferably 250° C. or less.

The fine silver particle dispersion of the present embodiment may contain a carboxylic acid in addition to the above short chain amine having 5 or less carbon atoms as long as being within the scope that will not impair the effects of the present invention. The carboxyl group in one molecule of the carboxylic acid has a relatively high polarity and is easy to get an interaction by the hydrogen bond, but the remaining part other than the functional groups has a relatively low polarity. Further, the carboxyl group tends to show acidic properties. Furthermore, when the carboxylic acid is localized (attached) to at least a port of the surface of the fine silver particle in the fine silver particle dispersion of the present invention (in other words, when at least a port of the surface of the fine silver particle is covered), the solvent and the fine silver particle can cause sufficient affinity, and the fine silver particles can be prevented from agglomeration with each other (improve the dispersing property).

As the carboxylic acid, a compound having at least one carboxyl group can be widely used, and examples include formic acid, oxalic acid, acetic acid, hexanoic acid, acrylic acid, octylic acid, oleic acid, and the like. A part of the carboxylic acid may form a salt with a metal ion. As the metal ion, two or more metal ions may be contained.

The above carboxylic acid may be a compound containing a functional group other than carboxyl group, such as amino group, hydroxyl group, carboxyl group, an alkoxy group, carbonyl group, an ester group or mercapto group. In this case, it is preferable that the number of the carboxyl group is larger than the number of the functional groups other than the carboxyl group. Further, the carboxylic acid may be used alone or in combination of two or more. In addition, it is preferable that a boiling point under normal pressure is preferably 300° C. or less, further preferably 250° C. or less. The amine and the carboxylic acid form an amide. Since the amide group also appropriately be adsorbed on the surface of the fine silver particle, the amide group may be adhered on the surface of the fine silver particle.

When a colloid is formed by the fine silver particles and the organic substances (such as the above short chain amine having 5 or less carbon atoms) adhered on the surface of the fine silver particle, it is preferable that a content of the organic components in the colloid is 0.5 to 50% by mass. When the content of the organic components id 0.5% by mass or more, the preservation stability of the obtained fine silver particle dispersion tends to be improved, and when 50% by mass or less, the conductivity of the sintered article obtained by heating the fine silver particle dispersion tends to be good. More preferable content of the organic components is 1 to 30% by mass, and further preferable content is 2 to 15% by mass.

(1-3) High Polar Solvent

The fine silver particle dispersion of the present embodiment is that the fine silver particles are dispersed in various high polar solvent.

As the solvent, there can be used various high polar solvents as long as being within the scope that will not impair the effects of the present invention. Examples of the high polar solvent include methanol, ethanol, propanol, isopropanol, butanol, isobutanol, 2-butanol, pentanol, hexanol, isoamyl alcohol, furfuryl alcohol, nitromethane, acetonitrile, pyridine, acetone cresol, dimethylformamide, dioxane, ethylene glycol, glycerol, phenol, p-cresol, propyl acetate, isopropyl acetate, tert-butanol, 1-pentanol, 2-pentanol, 4-methyl-2-pentanol, 3-methyl-1-pentanol, 3-methyl-2-pentanol, 2-butanol, 1-hexanol, 2-hexanol, 2-pentanone, 2-heptanone, 2-(2-ethoxyethoxy)ethyl acetate, 2-butoxyethyl acetate, 2-(2-butoxyethoxy)ethyl acetate, 2-methoxyethyl acetate, 2-hexyloxyethanol, and the like. According to the present invention, the alcohol having 1 to 6 carbon atoms is preferably used because of good affinity with the short chain amine having 5 or less carbon atoms, and specific examples include methanol, ethanol, isopropyl alcohol, or n-propyl alcohol is preferably used. Further, the solvent may be used alone or in combination of two or more.

(1-4) Dispersant

It is preferable that the fine silver particle dispersion of the present embodiment further contains the dispersant having an acid value in order to disperse the fine silver particles. By using the dispersant, the dispersing stability of the fine silver particles in the solvent can be improved. Here, the acid value of the dispersant is preferably 5 to 200, and further preferably the dispersant has a functional group derived from a phosphoric acid.

When the acid value of the dispersant is 5 or more, the dispersant begins to adsorb to the metal substance where the amine is coordinated to make the surface basic through acid-basic interaction, and when being 200 or less, since there is not excess amount of adsorption sites so as to be adsorbed in the suitable manner. Further, when the dispersant has the functional group derived from a phosphoric acid, since phosphor P and oxygen O pull with each other through a metal M, it is most effective for the adsorption of a metal or a metal compound, and thus, the suitable dispersing property can be obtained by the minimum adsorption amount.

Examples of the polymer dispersant having an acid value of 5 to 200 include a SOLSPERSE series available from The Lubrizol Corporation such as SOLSPERSE-16000(aliphatic-aromatic-organic pigment-carbon black-hyperdispersant), 21000 (aliphatic-aromatic-titanium dioxide-inorganic pigment-hyperdispersant), 41000 (acrylate monomer-ester ketone-alcohol-titanium dioxide-inorganic pigment-silica-hyperdispersant), 41090(water-water/glycol-titanium dioxide-inorganic pigment-silica-hyperdispersant), 43000 (water-water/glycol-organic pigment-carbon black-titanium dioxide-inorganic pigment-hyperdispersant), 44000 (water-water/glycol-organic pigment-carbon black-titanium dioxide-inorganic pigment-hyperdispersant), 46000 (water-organic pigment-carbon black-titanium dioxide-inorganic pigment-hyperdispersant) or 54000 (eco solvent-alcohol-organic pigment-carbon black-hyperdispersant); a DISPERBYK series available from BYK Japan KK such as DISPERBYK-102(solution of a copolymer having acidic groups), 110 (solution of a copolymer with acidic groups), 111 (copolymer with acidic groups), 170 (solution of a high molecular weight block copolymer with pigment affinic groups), 190 (solution of a high molecular weight block copolymer with pigment affinic groups), 194N (solution of a copolymer with pigment affinic groups), 2015 (solution of a structured acrylate copolymer with pigment-affinic groups), 2090 (Modified polyalkoxylate with acidic pigment affinic groups) or 2096 (preparation of polar acidic esters of high molecular weight alcohols); a TEGO Dispers series available from Evonik Industries AG such as 610 (polyether/copolymer of styleneoxide and ethyleneoxide), 610S (solution of high molecular weight fatty acid derivatives including organic modified polysiloxane), 630 (polycarboxylic acid solution of amine derivative containing polymer), 651 (phosphoric ester of specially modified polyether polymer), 655 (phosphoric ester of specially modified polyether polymer), 750W (high molecular polymer having a pigment affinity functional group) or 755W (high molecular polymer having a pigment affinity functional group), a DISPARLON series available from Kusumoto Chemicals, Ltd. such as DA-375 (polyether phosphate ester compound) or DA-1200 (aliphatic polycarboxylic acid); Flowlen series available from KYOEISHA CHEMICAL Co., Ltd. such as G-700 (carboxyl group-containing modified polymer), G-900 modified polymer contained carboxylic acid), GW-1500 (carboxyl group-containing modified polymer), GW-1640 (carboxyl group-containing modified polymer) or WK-13E (acrylic polymer in 3-methyl-3-methoxy-butanol).

The content of the dispersant when adding to the fine silver particle dispersion of the present embodiment may be adjusted depending to desired properties such as a viscosity, and incase that the fine silver particle dispersion is used as a silver ink, the content of the dispersant is preferably 0.5 to 20% by mass, and when using as a silver paste, the content of the dispersant is preferably 0.1 to 10% by mass It is preferable that the content of the polymer dispersant is 0.1 to 15% by mass. When the content of the polymer dispersant is 0.1% by mass or more, the dispersing stability of the obtained fine silver particle dispersion is improved, and when the content is too large, the low temperature sinterability becomes lowered. From these points of view, more preferable content of the polymer dispersant is 0.3 to 10% by mass, further preferably 0.5 to 8% by mass.

For the dispersion of the present embodiment, it is further preferable that the weight loss at the time of heating from room temperature to 200° C. according to the thermal analysis is 20% by mass or less, and the weight loss at the time of heating from 200° C. to 500° C. is 10% by mass or less. Here, the weight loss at the time of heating up to 200° C. shows the content of the short chain amine if a low temperature component that mainly contributes to the low temperature sinterability, and the weight loss of the high temperature component between 200 and 500° C. shows the content of the dispersant having an acid value that mainly contributes to the dispersing stability. When the short chain amine and the high temperature component is too large, the low temperature sinterability is impaired. Namely, when the weight loss at the time of heating from room temperature to 200° C. is 20% by mass or less, and the weight loss at the time of heating from 200 to 500° C. is 10% by mass or less, the low temperature sinterability is more superior.

(1-5) Protective Agent (Protective Dispersant)

It is preferable that the fine silver particle dispersion of the present embodiment further contains a dispersant having an acid value (protective dispersant) as a protective agent added before the synthesis of the fine silver particle. Here, the "protective dispersant" may be the same kind as or different kind from the aforementioned "dispersant having an acid value" which is added after the synthesis of the fine silver particle.

(1-6) Other Components

Any components such as an oligomer component that fulfills a role, for example, as a binder, a resin component, an organic solvent (a port of solid components may be dissolved or dispersed), a surfactant, a thickener or a regulator of surface tension can be added to the components above, in order to add functions such as moderate viscosity, adhesiveness, drying characteristic or printability according to the intended use, within the scope that will not impair the effects of the present invention. Such optional components are not particularly limited.

Examples of the resin component include a polyester-based resin, a polyurethane-based resin such as blocked isocyanate, a polyacrylate-based resin, a polyacrylamide-based resin, a polyether-based resin, a melamine-based resin, and a terpene-based resin, and these may be used alone or in combination of two or more.

Examples of the thickener include a clay minerals such as clay, bentonite or hectorite; an emulsion such as a polyester-based emulsion resin, an acrylic-based emulsion resin, a polyurethane-based emulsion resin or blocked isocyanate; a cellulose derivatives such as methylcellulose, carboxymethylcellulose, hydroxyethyl cellulose, hydroxypropylcellulose or hydroxypropyl methylcellulose; a polysaccharide such as xanthane gum or guar gum, and the like are exemplified, and these may be used alone or in combination of two or more.

A surfactant which is different from the aforementioned surfactant may be added. In a multi-component solvent-series inorganic colloidal dispersion liquid, roughness on a coating surface and a bias of solid content easily occur due to a difference in a rate of volatilization upon drying. Addition of a surfactant to the fine silver particle dispersion of the present embodiment enables to suppress these disadvantages and to obtain the fine silver particle dispersion that can form a uniform conductive coating.

The surfactant that is usable in the present embodiment is not particularly limited, and any of anionic surfactants, cationic surfactants, and nonionic surfactants are usable, and, for example, alkyl benzene sulfonate, quaternary ammonium salt and the like are exemplified. Among them, since effects can be obtained with a small amount, a fluorine-contain surfactant and a silicone-containing surfactant are preferable.

(2) Fine Silver Particle

The fine silver particle of the present embodiment is the fine silver particle where an alkoxyamine having 5 or less carbon atoms and a partition coefficient log P of −1.0 to 1.4 adheres on at least a part of the fine silver particle.

When adhering the alkoxyamine having 5 or less carbon atoms and a partition coefficient log P of −1.0 to 1.4 adheres on at least a part of the fine silver particle, it is possible to endow the excellent dispersing property to various solvents (particularly to the high polar solvent) and the low temperature sinterability with the fine silver particle.

As the above solvents, various solvent can be used within the scope that will not impair the effects of the present invention, and it is possible to use a solvent having a SP value (solubility parameter) of 7.0 to 15.0. Here, since one of the features of the fine silver particle dispersion of the present invention is that the fine silver particles are uniformly dispersed even in the high polar solvent, according to the present invention, the alcohol having 1 to 6 carbon atoms is preferably used because of good affinity with the short chain amine having 5 or less carbon atoms. Further, the solvent may be used alone or in combination of two or more.

Examples of the solvent having the SP value (solubility parameter) of 7.0 to 15.0 include hexane (7.2), triethylamine (7.3), ethyl ether (7.7), n-octane (7.8), cyclohexane (8.3), n-amyl acetate (8.3), isobutyl acetate (8.3), methyl isopropyl ketone (8.4), amylbenzene (8.5), butyl acetate (8.5), carbon tetrachloride (8.6), ethylbenzene (8.7), p-xylene (8.8), toluene (8.9), methyl propyl ketone (8.9), ethyl acetate (8.9), tetrahydrofuran (9.2), methyl ethyl ketone (9.3), chloroform (9.4), acetone (9.8), dioxane (10.1), pyridine (10.8), isobutanol (11.0), n-butanol (11.1), nitroethane (11.1), isopropyl alcohol (11.2), m-cresol (11.4), acetonitrile (11.9), n-propanol (12.1), furfuryl alcohol (12.5), nitromethane (12.7), ethanol (12.8), cresol (13.3), ethylene glycol (14.2), methanol (14.8), phenol, p-cresol, propyl acetate, isopropyl acetate, tert-butanol, 1-pentanol, 2-pentanol, 4-methyl-2-pentanol, 3-methyl-1-pentanol, 3-methyl-2-pentanol, 2-butanol, 1-hexanol, 2-hexanol, 2-pentanone, 2-heptanone, 2-(2-ethoxyethoxy)ethyl acetate, 2-butoxyethyl acetate, 2-(2-butoxyethoxy)ethyl acetate, 2-methoxyethyl acetate, 2-hexyloxyethanol, and the like.

The suitable particle size of the fine silver particle of the present embodiment is a nanometer size where the lowering of a melting point is caused, desirably 1 to 200 nm, and as occasion demand, particles having a micrometer size may be contained.

(3) Method for Producing Fine Silver Particle

The method for producing the fine silver particle of the present embodiment includes a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

In the first step, it is preferable that the short chain amine is added in an amount of 2 mol or more relative to 1 mol of the metal silver. When the short chain amine is added in an amount of 2 mol or more relative to 1 mol of the metal silver, the short chain amine can be adhered in an appropriate amount on the surface of the fine silver particle obtained by the reduction, and thus the fine silver particle can be endowed with the excellent dispersing property with respect to various solvents (particularly the high polar solvent) and the low temperature sinterability.

By controlling the formulations of the mixed liquid in the first step and the reduction conditions (for example, heating temperature, heating time, etc.) in the second step, it is preferable that the particle size of the fine silver particle is a nanometer size where the melting point is lowered, and more preferably 1 to 200 nm. Here, as occasion demand, particles having a micrometer side may be contained.

Any method for collecting the fine silver particles from the fine silver particle dispersion obtained in the above second step can be employed without limitation, and, for example, there is a method for washing the fine silver particle dispersion, and the like.

As a starting material for obtaining the silver particles coated with an organic substance (short chain amine having a partition coefficient log P of −1.0 to 1.4), various well-known silver compounds (metallic salts or their hydrates) can be used, and examples include a silver salt such as silver nitrate, silver sulfate, silver chloride, silver oxide, silver acetate, silver oxalate, silver formate, silver nitrite, silver chlorate or silver sulfide. These salts are not particularly limited as long as they can be reduced, and the silver salt may be used as being dissolved in an appropriate solvent, or dispersed in a solvent as they are. These may be used alone or in combination of two or more kinds.

Further, a method to reduce these silver compounds in the raw material liquid is not particularly limited, and for example, a method using a reducing agent, a method to irradiate a light such as ultraviolet rays, electron beams, ultrasonic waves or thermal energy, a method to heat, and the like are exemplified. Among them, the method using a reducing agent is preferable from a viewpoint of easy operation.

Examples of the reducing agent include, for example, amine compounds such as dimethylaminoethanol, methyldiethanolamine, triethanolamine, phenidone or hydrazine; for example, hydrogen compounds such as sodium borohydride, iodinated hydrogen or hydrogen gas; for example, oxides such as carbon monoxide or sulfurous acid; for example, low-valent metal salts such as ferrous sulfate, ferric oxide, iron fumarate, ferrous lactate, iron oxalate, ferric sulfide, tin acetate, tin chloride, diphosphate tin, tin oxalate, tin oxide or tin sulfate; for example, sugar such as ethylene glycol, glycerin, formaldehyde, hydroquinone, pyrogallol, tannin, tannic acid, salicylic acid or D-glucose, but the reducing agent is not particularly limited as long as it is dissolved into a dispersion medium and can reduce the above metal salt. In case of using the reducing agent, a reduction reaction can be accelerated by adding a light and/or heat.

As a specific method to prepare metal particles coated with the organic substance by using the metal salt, the organic substance, the dispersion medium and the reducing agent, for example, there is a method where the metal salt is dissolved into an organic solvent (for example, toluene or the like) to prepare a metal salt solution, a short chain amine and a dispersant only having an acid value is added as the dispersant into the metal salt solution, and next, a solution where the reducing agent has been dissolved is gradually added dropwise into this mixture, and the like.

In the method for producing the fine silver particles of the present embodiment, it is preferable to include a step where a dispersant having an acid value in order to disperse the fine silver particles is added and mixed. Here, the "protective dispersant having an acid value" includes all dispersants which do not contain an amine value, a hydroxyl value, and the like as an adsorbing group and a functional group. When using the dispersant, the dispersing stability of the fine silver particles in the solvent can be improved. An acid value of the dispersant is preferably 5 to 200, and the dispersant preferably contains a functional group derived from phosphoric acid.

A counter ion of the metal salt, a residue of the reducing agent and the dispersant other than the metal particles exist in a dispersion liquid containing the metal particles coated with the short chain amine and the dispersant having an acid value obtained as mentioned above, and electrolyte concentration and organic substance concentration of the entire liquid tends to be high. Since the liquid in such condition has high conductivity, and the like, coagulation of the metal particles occurs and they are easily precipitated. Alternatively, even if the metal particles are not precipitated, if a counter ion of metal salt, a residue of the reducing agent or a more than necessary amount for dispersion of excess dispersant remains, the conductive property may be deteriorated. Then, the metal particles coated with an organic substance can be certainly obtained by washing the solution containing the metal particles to remove any excessive residues.

As the washing method, for example, a method to repeat a process where a dispersion liquid containing the metal particles coated with the organic component is set stationary for a certain period of time, and after a generated supernatant solution is removed, a solvent to precipitate the fine silver particles (for example, water, methanol, a methanol/water mixed solvent, etc.) is added and the mixture is stirred again, and the mixture is further set stationary for a certain period of time and the generated supernatant solution is removed, several times; a method for centrifugal separation instead of setting stationary; a method for demineralization by an ultrafiltration apparatus or ion-exchange equipment and the like are exemplified. The metal particles coated with the "short chain amine and the dispersant having an acid value" of the present embodiment can be obtained by removing excess residues with such washing, and, by removing an organic solvent.

Among the present embodiments, the metal colloidal dispersion liquid is obtained by mixing the metal particles coated with the short chain amine and the dispersant having an acid value obtained above and the dispersion medium explained in the present embodiments. Such method for mixing the metal particles coated with the "short chain amine and the dispersant having an acid value" and a dispersion medium is not particularly limited, and it can be conducted with a conventionally well-known method using an agitator or a stirrer. Mixing can be stirred with a spatula, and an ultrasonic homogenizer with appropriate output may be aimed.

When a metal colloidal dispersion liquid containing a plurality of metals is obtained, the producing method is not particularly limited, and for example, if a metal colloidal dispersion liquid made from silver and other metals is manufactured, a dispersion liquid containing metal particles and another dispersion liquid containing other metal particles are separately manufactured in the preparation of metal particles coated with the organic substance above, and these may be mixed later, and a silver ion solution and other metal ion solution may be mixed and then be reduced.

He metal particle may be produced by a method for producing a fine silver particle, which comprises a first step for preparing a mixed liquid of a silver compound which is decomposed by reduction to produce a metal silver, and a short chain amine having a partition coefficient log P of −1.0 to 1.4, and a second step for reducing the silver compound in the mixed liquid to produce a fine silver particle where a short chain amine having 5 or less carbon atoms which is adhered to at least a part of the surface of the particle.

For example, silver particles protected with a protective film of the short chain amine can be manufactured by heating a metal compound, such as silver nitrate containing silver, and a complex compound generated from the short chain amine, and by agglomerating atomic silvers that are generated by decomposing a metal compound of oxalate ion contained in the complex compound.

Thus, in the metal amine complex decomposition method for producing metal particles coated with amine, because atomic metal is generated by decomposition reaction of a metal amine complex, which is single variety of molecule, it is possible to uniformly generate an atomic metal within a reaction system, and compared to a case of generating a metal atom due to reaction between a plurality of components, unevenness of reaction caused by composition fluctuations of components constituting the reaction is suppressed, and it is advantageous particularly on the occasion of producing a large quantity of metal powder on an industrial scale.

Further, in the metal amine complex decomposition method, the short chain amine molecule coordinate-bonds with a metal atom to be generated, and it is seemed that movement of the metal atom on the occasion of generating agglomeration is controlled by a function of the short chain amine molecule coordinated in the metal atom. As a result, according to the metal amine complex decomposition method, it is possible to produce very fine metal particles having a narrow particle size distribution.

In addition, many short chain amine molecules generate comparatively weak force of coordinate bond on the surface of metal fine particles to be produced, as well, and because these form a dense protective coating on the surfaces of the metal particles, it is possible to produce coated metal particles where their surfaces having an excellent preservation stability are clean. Further, because the short chain amine molecules forming the coating are easily detachable by heating or the like, it is possible to produce metal particles, which are sinterable at a very low temperature.

Further, when generating a composite compound such as a complex compound, by mixing a solid metal compound and an amine, generation of a composite compound such as a complex compound, becomes easy by mixing and using the short chain amine having 5 or less carbon atoms into the dispersant having an acid value constituting a coating comprising coated silver particles, and it is possible to produce a composite compound by mixing for a short time. Further, it is possible to produce coated silver particles having properties according to various uses by mixing and using the short chain amine.

Though the dispersant paste of the present embodiment obtained as mentioned above is usable as a composition for metal bonding as it is, various inorganic components and organic components can be added within a range not impairing the dispersion stability and the low-temperature sinterability of the conductive ink and the conductive paste.

[Application Method]

When the conductive dispersion of the present embodiment is used, after applying onto a substrate, the conductive dispersion is sintered with heating and baking at a relatively low temperature (for example, 300° C. or less, preferably 100° C. to 250° C.) to enable obtainment of an conductive coating. When sintering, the temperature can also be increased and decreased in a step-by-step. Further, it is also possible to previously apply a surfactant or a surface active agent on a surface where the conductive dispersion is applied.

Here, "application" of the conductive dispersion of the present embodiment is a concept including a case of applying the conductive dispersion in a planar manner and a case of applying (drawing) in a linear manner, as well. It is possible for the configuration of the applied coating made from the conductive dispersion before heating and baking to be a desired configuration. Therefore, the coating of the conductive dispersion of the present embodiment sintered with heating and baking is a concept including both the planer coating and the linear coating, and these planar coating and linear coating can be continuous and discontinuous, and can include a continuous portion and a discontinuous portion.

A substrate usable in the present embodiment is not particularly limited even it should be able to be sintered by applying the conductive dispersion and then heating and baking the conductive dispersion, and it is preferable to be a member having a heat resistance to a degree of not being damaged at a temperature upon heating and baking.

Examples of materials to constitute the substrate include a polyester such as polyamide (PA), polyimide (PD, polyamideimide (PAD, polyethylene terephthalate (PET), polybutylene terephthalate (PBT) or polyethylene naphthalate (PEN); polycarbonate (PC), polyether sulfone (PES), a vinyl resin, a fluorine-containing resin, a liquid crystal polymer, a ceramic, a glass, a metal, and the like.

Further, the substrate may be in various configurations, for example, plate-like or strip-like, and it may be rigid or flexible. The thickness of the substrate can be appropriately selected. For improvement of bonding property or adhesiveness or for other purpose, a member where a surface layer is formed or a member where a surface treatment such as a hydrophillic treatment is applied may be used.

It is possible to use various methods in the step for applying the conductive dispersion onto the substrate, and to employ appropriately by selecting from, for example, dipping, screen printing, reversal printing, micro contact printing, spraying, bar-coating, spin-coating, inkjet, dispenser, a pin transfer method, a stamping method, an application system with a brush, casting, flexo, gravure, an offset method, a transfer method, a hydrophilic and hydrophobic pattern method, a syringe, and the like.

In the present embodiment, when the conductive dispersion contains a binder component, the binder component may be sintered from a viewpoint of improvement of strength of a coating, and the like, but the binder component can be all removed by controlling baking conditions, in order to adjust a viscosity of the conductive dispersion for applying to various printing methods as principal purposes of the binder component.

The method for heating and baking is not particularly limited, but the conductive dispersion can be sintered by heating and baking so as to cause a temperature of the conductive dispersion applied or drawn on the substrate, for example, at 300° C. or less, using, for example, a conventionally well-known oven, or the like. The lower limit of the temperature for heating and baking is not particularly limited, and it can be a temperature within a scope of not impairing the effects of the present invention. Here, in the coating after baking, the smaller residual volume of the organic substance is better from a point to obtain higher strength as much as possible, but a portion of the organic substance may remain within a scope of not impairing the effects of the present invention.

[Bonding Method]

In case that the composition for metal bonding (fine silver particle) of the present embodiment is used, high bonding strength can be obtained in bonding of members in association with heating. Namely, a first member to be bonded and a second member to be bonded can be bonded by an application step of the composition for bonding to apply the composition for metal bonding between the first member to be bonded and the second member to be bonded, and a bonding step to bake and bond the composition for bonding that has been applied between the first member to be bonded and the second member to be bonded at a desired temperature (for example, 300° C. or less, preferably 150° C. to 250° C.).

In the bonding step, pressure can be applied in the direction where the first member to be bonded and the second member to be bonded are diagonal, but it is one of the advantages of the present invention to be able to obtain a sufficient bonding strength without particular pressurization. Further, when sintering, the temperature can also be increased and decreased in a step-by-step. Further, it is also possible to previously apply a surfactant or a surface active agent on a surface where the conductive dispersion is applied.

The present inventors, as a result of intensive study, have found that the first member to be bonded and the second member to be bonded can be more securely bonded with high bonding strength (a bonded body can be obtained), when the composition for metal bonding of the present embodiment is used as the composition for metal bonding in the application step of the composition for metal bonding.

As the dispersion medium of the composition for metal bonding of the present invention, various substances are usable within a scope not impairing the effects of the present invention, and for example, a hydrocarbon, an alcohol, and the like can be exemplified.

Examples of the aliphatic hydrocarbon include a saturated or unsaturated aliphatic hydrocarbon such as tetradecane, octadecane, heptamethylnonane, tetramethylpentadecane, hexane, heptanes, octane, nonane, decane, tridecane, methylpentane, normal paraffin and isoparaffin, and the like.

Further, the alcohol is a compound containing one or more OH groups in a molecular structure, and an aliphatic alcohol, a cyclic alcohol and an alicyclic alcohol are exemplified, and each can be used alone or in combination of two or more kinds. Further, a portion of the OH groups may be converted to acetoxy group, or the like within a scope not impairing the effects of the present invention.

Examples of the aliphatic alcohol include a saturated or unsaturated $C_{6-30}$ aliphatic alcohol such as heptanol, octanol (such as 1-octanol, 2-octanol or 3-octanol), decanol (such as 1-decanol), lauryl alcohol, tetradecyl alcohol, cetyl alcohol, 2-ethyl-1-hexanol, octadecyl alcohol, hexadecenol, oleyl alcohol, and the like.

Here, "application" of the composition for metal bonding of the present embodiment is a concept including a case of applying the composition for metal bonding in a planar manner and a case of applying (drawing) in a linear manner, as well. It is possible for the configuration of the applied coating made from the composition for metal bonding before heating and baking to be a desired configuration. Therefore, in the bonded article of the composition for metal bonding of the present embodiment after being baked with heating, the composition for metal bonding is a concept including both the planer bonded layer and the linear bonded layer, and these planar bonded layer and linear bonded layer can be continuous and discontinuous, and can include a continuous portion and a discontinuous portion.

The first member to be bonded and the second member to be bonded usable in the present embodiment is not particularly limited even it should be able to be sintered by applying the composition for metal bonding and then heating to obtain the bonding, and it is preferable to be a member having a heat resistance to a degree of not being damaged at a temperature upon heating and baking.

Examples of materials to constitute the member to be bonded include a polyester such as polyamide (PA), polyimide (PI), polyamideimide (PAI), polyethylene terephthalate (PET), polybutylene terephthalate (PBT) or polyethylene naphthalate (PEN); polycarbonate (PC), polyether sulfone (PES), a vinyl resin, a fluorine-containing resin, a liquid crystal polymer, a ceramic, a glass, a metal, and the like, and preferable is the metal member to be bonded. The reason why the metal member to be bonded is preferable is that metal member is excellent in heat resistance and also that the inorganic particle is compatible with the metal in the composition for metal bonding of the present invention.

Further, the member to be bonded may be in various configurations, for example, plate-like or strip-like, and it may be rigid or flexible. The thickness of the substrate can be appropriately selected. For improvement of bonding property or adhesiveness or for other purpose, a member where a surface layer is formed or a member where a surface treatment such as a hydrophilic treatment is applied may be used.

It is possible to use various methods in the step for applying the composition for metal bonding to the member to be bonded, and to employ appropriately by selecting from, for example, dipping, screen printing, spraying, bar-coating, spin-coating, inkjet, dispenser, a pin transfer method, a stamping method, an application system with a brush, casting, flexo, gravure, an offset method, a transfer method, a hydrophilic and hydrophobic pattern method, a syringe, and the like.

As mentioned above, the coating after applied is baked by heating, for example, at a temperature of 300° C. or less within a scope not impairing the member to be bonded to obtain the bonded article of the present embodiment. In the present embodiment, as mentioned before, since the composition for metal bonding of the present embodiment is used, the bonding layer having an excellent adhesion to the member to be bonded, and a strong bonding strength can be exactly obtained.

In the present embodiment, when the composition for metal bonding contains a binder component, the binder component may be sintered from a viewpoint of improvement of strength of the bonding layer, and improvement of strength between the members to be bonded, and the like, but the binder component can be all removed by controlling baking conditions, in order to adjust a viscosity of the composition for metal bonding for applying to various printing methods as principal purposes of the binder component.

The method for baking is not particularly limited, but the composition for metal bonding can be sintered by baking so as to cause a temperature of the composition for metal bonding applied or drawn on the member to be bonded, for example, at 300° C. or less, using, for example, a conventionally well-known oven, or the like. The lower limit of the temperature for baking is not particularly limited, and can be a temperature that the members to be bonded can be bonded to each other and is within a scope of not impairing the effects of the present invention. Here, in the composition for metal bonding after baking, the smaller residual volume of the organic substance is better from a point to obtain higher strength as much as possible, but a portion of the organic substance may remain within a scope of not impairing the effects of the present invention.

Furthermore, an organic substance is contained in the composition for metal bonding of the present invention, but unlike a conventional one utilizing thermal curing, such as an epoxy resin, this does not obtain the bonding strength after baking due to action of the organic substance, but it obtains a sufficient bonding strength due to fusion of the fused metal particles as described above. Accordingly, after bonding, even if the organic substance remained because of placing in an environment to be used where the temperature is higher than the bonding temperature is deteriorated or decomposed and then has disappeared, there is no possibility to cause reduction of the bonding strength, and therefore, it has an excellent heat resistance.

According to the composition for metal bonding of the present embodiment, because a bonding having a bonding layer expressing a high conductive property can be realized even by baking with a low-temperature heating, for example, at approximately 150° C. to 250° C., the members to be bonded, which are relatively weak against heat, can be bonded. Further, the baking time is not particularly limited, but it should be a baking time that can cause bonding according to the baking temperature.

In the present embodiment, in order to further enhance the adhesiveness between the members to be bonded and the bonding layer, the surface treatment can be applied to the members to be bonded. Examples of the surface treatment method include a method of performing dry processing such as corona treatment, plasma treatment, UV treatment or electron-beam treatment; a method where a primer layer or a conductive paste receptive layer is pre-established on the substrate, and the like are exemplified.

In the above, the representative embodiments of the present invention are explained, but the present invention is not limited thereto.

In the following, the fine silver particle dispersion, the fine silver particle, and the producing method thereof according to the present invention are explained more specifically in EXAMPLE, but the present invention is not be limited to those examples.

EXAMPLE

Example 1

200 ml of toluene (first class grade chemicals manufactured by Wako Pure Chemical Industries, Ltd.) and 11 g of butylamine (first class grade chemicals manufactured by Wako Pure Chemical Industries, Ltd., number of carbon atoms: 4, log P: 1.0) were mixed and sufficiently stirred with a magnetic stirrer (molar ratio of the added amine being 2.5 to the silver). While stirring, 10 g of silver nitrate (special grade chemicals manufactured by Toyo Chemical Industrial Co., Ltd.) was added into this mixture, and after the silver nitrate was dissolved, 10 g of DISPERBYK-2090 and 10 g of hexanoic acid (special grade chemicals manufactured by Wako Pure Chemical Industries, Ltd.) were added.

A 0.02 g/ml of sodium borohydride solution prepared by adding 1 g of sodium borohydride (manufactured by Wako Pure Chemical Industries, Ltd.) into 50 ml of ion-exchanged water was instilled into this mixture, and a liquid containing silver particles was obtained. After stirring for one hour, 200 ml of methanol (special grade chemicals manufactured by Wako Pure Chemical Industries, Ltd.) was added, and the silver particles were agglomerated and precipitated. In addition, after the silver particles were completely precipitated with centrifugal separation, toluene and methanol, which are supernatants, were removed and excess organic substances were removed, and approximately 6 g of the silver particles 1 were obtained. To the obtained fine silver particles, the following dispersion stability, reducibility, volume resistivity, and organic component measurement were evaluated, and the obtained results are shown in Table 1. The dispersing medium was 2-pentanol.

[Evaluation Tests]

(1) Dispersing Property

The fine silver particles 1 obtained as described above was dispersed in an appropriate solvent and was set stationary in a container, and one day later at room temperature, dispersing property of the dispersion liquid was evaluated by visually observing whether or not there was any precipitation and conditions of the supernatants. A case when any precipitation was hardly confirmed at the bottom of the container was evaluated as "◯"; a case when a small amount precipitation was confirmed was evaluated as "Δ"; and a case when there was obviously a difference between upper side and a bottom side of the container and precipitation was clearly confirmed was evaluated as "x".

(2) Reducibility

The dispersion as described above was diluted 100-fold into a dispersion medium and the resulting state was visually evaluated. A case when particles were dispersed was evaluated as "◯"; a case when agglomeration or silver mirror was partially observed was evaluated as "Δ"; and a case when agglomeration and precipitation was generated was evaluated as "x".

(3) Volume Resistivity

A coating was formed by applying the dispersion obtained as mentioned above onto a glass slide with a brush; the silver colloidal dispersion liquid 1 was sintered by heating and baking under conditions at 120° C. for 30 minutes in a gear oven; and an conductive coating was formed. Volume resistivity of this coating was measured using a direct-current precision measuring instrument "Portable Precision Double Bridge 2769" manufactured by Yokogawa Meters & Instruments Corporation. Specifically, based upon a formula below, volume resistivity was converted from in-measuring terminal distance and thickness of an conductive coating. A case when the volume resistivity was 20 μΩ·cm or less was evaluated as "◯" and another case when it exceeded 20 μΩ·cm was evaluated as "x".

(Volume resistivity $\rho v$)=(Resistance value $R$)×(Coating width $W$)×(Coating thickness $t$)/(Distance between terminals $L$)   Equation:

(4) Organic Component Measurement

Content of the organic component contained in the dispersion obtained as mentioned above was measured using a thermogravimetric method. Specifically, solid content of the dispersion was heated at 10° C./min of rate of temperature increase, and the content of the organic component was identified as a weight reduction at room temperature to 500° C.

Example 2

200 ml of toluene (first class grade chemicals manufactured by Wako Pure Chemical Industries, Ltd.) and 13.4 g of 3-methoxypropylamine (first class grade chemicals manufactured by Wako Pure Chemical Industries, Ltd., number of carbon atoms: 4, log P: −0.5) were mixed and sufficiently stirred with a magnetic stirrer (molar ratio of the added amine being 2.5 to the silver). While stirring, 10 g of silver nitrate (special grade chemicals manufactured by Toyo Chemical Industrial Co., Ltd.) was added into this mixture, and after the silver nitrate was dissolved, 10 g of DISPERBYK-111 and 10 g of hexanoic acid (special grade chemicals manufactured by Wako Pure Chemical Industries, Ltd.) were added. A 0.02 g/ml of sodium borohydride solution prepared by adding 1 g of sodium borohydride (manufactured by Wako Pure Chemical Industries, Ltd.) into 50 ml of ion-exchanged water was instilled into this mixture, and a liquid containing silver particles was obtained. After stirring for one hour, 200 ml of methanol (special grade chemicals manufactured by Wako Pure Chemical Industries, Ltd.) was added, and the silver particles were agglomerated and precipitated. In addition, after the silver particles were completely precipitated with centrifugal separation, toluene and methanol, which are supernatants, were removed and excess organic substances were removed, and approximately 6 g of the silver particles 2 were obtained. The dispersing medium was isobutanol. The obtained fine silver particles 2 were evaluated in the same manner as in Example 1, and the obtained results are shown in Table 1.

Example 3

8.9 g of 3-methoxypropylamine (first class grade chemicals manufactured by Wako Pure Chemical Industries, Ltd., number of carbon atoms: 4, log P: −0.5) and 0.3 g of DISPERBYK-111 of a polymer dispersant were mixed and sufficiently stirred with a magnetic stirrer to prepare an amine mixture (molar ratio of the added amine being 10 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance (first step).

The thus obtained mixture was transferred to an oil bath, and stirred with heating at 120° C. Just after the stirring, a reaction started with generation of carbon dioxide, and thereafter, the stirring was continued until the generation of the carbon dioxide was terminated to obtain a suspension where the fine silver particles were suspended in the amine mixture (second step).

Next, in order to displace the dispersing medium of the suspension, after adding 10 mL of a mixed solvent of methanol/water and stirring, the fine silver particles were separated by precipitating with a centrifugal treatment, and 10 mL of a mixed solvent of methanol/water was added again, and then subjected to stirring and separating with the centrifugal treatment to obtain fine silver particle 3. The dispersing medium was isobutanol. The obtained fine silver particles 3 were evaluated in the same manner as in Example 1, and the obtained results are shown in Table 1.

Example 4

Fine silver particles 4 were obtained in the same manner as in Example 3 except that 0.4 g of DISPERBYK-190 was introduced instead of DISPERBYK-111. The dispersing medium was ethanol. The obtained fine silver particles 4 were evaluated in the same manner as in Example 1, and the obtained results are shown in Table 1.

Example 5

Fine silver particles 5 were obtained in the same manner as in Example 3 except that 0.3 g of DISPERBYK-102 was introduced instead of DISPERBYK-111. The dispersing medium was ethanol. The obtained fine silver particles 5 were evaluated in the same manner as in Example 1, and the obtained results are shown in Table 1.

Example 6

Fine silver particles 6 were obtained in the same manner as in Example 4 except that 7.3 g of butylamine (first class grade chemicals manufactured by Wako Pure Chemical Industries, Ltd., number of carbon atoms: 4, log P: 1.0) (molar ratio of the added amine being 10 to the silver) instead of 3-methoxypropylamine. The dispersing medium was hexanol. The obtained fine silver particles 6 were evaluated in the same manner as in Example 1, and the obtained results are shown in Table 1.

Example 7

Fine silver particles 7 were obtained in the same manner as in Example 4 except that 7.5 g of 2-methoxyethylamine (first class grade chemicals manufactured by Wako Pure Chemical Industries, Ltd., number of carbon atoms: 3, log P: −0.9) (molar ratio of the added amine being 10 to the silver) instead of 3-methoxypropylamine. The dispersing medium was ethanol. The obtained fine silver particles 7 were evaluated in the same manner as in Example 1, and the obtained results are shown in Table 1.

Example 8

3.6 g of butylamine (first class grade chemicals manufactured by Wako Pure Chemical Industries, Ltd., number of carbon atoms: 4, log P: 1.0), 4.5 g of 3-methoxypropylamine (first class grade chemicals manufactured by Wako Pure Chemical Industries, Ltd., number of carbon atoms: 4, log P: −0.5) and 0.25 g of DISPERBYK-102 of a polymer dispersant were mixed and sufficiently stirred with a magnetic stirrer to prepare an amine mixture (molar ratio of the added amine being 10 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance (first step). In the second step and the later, the same procedures as in Example 3 were repeated to obtain fine silver particles 8. The dispersing medium was ethanol. The obtained fine silver particles 8 were evaluated in the same manner as in Example 1, and the obtained results are shown in Table 1.

Example 9

Fine silver particles 9 were obtained in the same manner as in Example 7 except that 0.3 g of TEGO Dispers655 (manufactured by Evonik Co., Ltd.) was used instead of DISPERBYK-102. The dispersing medium was ethanol. The obtained fine silver particles 9 were evaluated in the same manner as in Example 1, and the obtained results are shown in Table 2.

Example 10

Fine silver particles 10 were obtained in the same manner as in Example 7 except that 0.3 g of Dispalon DA-375 (manufactured by Kusumoto Chemicals, Ltd.) was used instead of DISPERBYK-102. The dispersing medium was isobutanol. The obtained fine silver particles 10 were evaluated in the same manner as in Example 1, and the obtained results are shown in Table 2.

Example 11

Fine silver particles 11 were obtained in the same manner as in Example 4 except that 7.3 g of butylamine (first class grade chemicals manufactured by Wako Pure Chemical Industries, Ltd., number of carbon atoms: 4, log P: 1.0) (molar ratio of the added amine being 10 to the silver) instead of 3-methoxypropylamine. The dispersing medium was ethanol. The obtained fine silver particles 11 were evaluated in the same manner as in Example 1, and the obtained results are shown in Table 2.

Example 12

1.1 g of 2-methoxyethylamine (first class grade chemicals manufactured by Wako Pure Chemical Industries, Ltd., number of carbon atoms: 3, log P: −0.9) and 0.3 g of DISPERBYK-102 of a polymer dispersant were mixed and sufficiently stirred with a magnetic stirrer to prepare an amine mixture (molar ratio of the added amine being 1.5 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance (first step). In the second step and the later, the same procedures as in Example 3 were repeated to obtain fine silver particles 12. The dispersing medium was ethanol. The obtained fine silver particles 12 were evaluated in the same manner as in Example 1, and the obtained results are shown in Table 2.

Example 13

2.7 g of 3-methoxypropylamine (first class grade chemicals manufactured by Wako Pure Chemical Industries, Ltd., number of carbon atoms: 4, log P: −0.5) and 0.3 g of DISPERBYK-102 of a polymer dispersant were mixed and sufficiently stirred with a magnetic stirrer to prepare an amine mixture (molar ratio of the added amine being 3 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance (first step). In the second step and the later, the same procedures as in Example 3 were repeated to obtain fine silver particles 13. The dispersing medium was ethanol. The obtained fine silver particles 13 were evaluated in the same manner as in Example 1, and the obtained results are shown in Table 2.

Example 14

200 ml of toluene (first class chemicals manufactured by Wako Pure Chemical Industries, Ltd.) and 11 g of butylamine (first class grade chemicals manufactured by Wako Pure Chemical Industries, Ltd., number of carbon atoms: 4, log P: 1.0) were mixed and sufficiently stirred with a magnetic stirrer (molar ratio of the added amine being 2.5 to the silver). While stirring, 10 g of silver nitrate (special grade chemicals manufactured by Toyo Chemical Industrial Co., Ltd.) was added into this mixture, and after the silver nitrate was dissolved, 10 g of DISPERBYK-2090 and 10 g of hexanoic acid (special grade chemicals manufactured by Wako Pure Chemical Industries, Ltd.) were added. Thereto a 0.02 g/ml of sodium borohydride solution prepared by adding 1 g of sodium borohydride (manufactured by Wako Pure Chemical Industries, Ltd.) into 50 ml of ion-exchanged water was instilled into this mixture, and a liquid containing fine silver particles was obtained. After stirring for one hour, 200 ml of methanol (special grade chemicals manufactured by Wako Pure Chemical Industries, Ltd.) was added, and the silver particles were agglomerated and precipitated. In addition, after the fine silver particles were completely precipitated with centrifugal separation, toluene and methanol, which are supernatants, were removed and excess organic substances were removed, and added 9.8 g of 2-pentanol containing 0.2 g of SOLSPERSE41000 (manufactured by The Lubrizol Corporation) to obtain a fine silver particle dispersion 1. The dispersion was evaluated in the same manner as in Example 1, and the obtained results are shown in Table 3.

Example 15

200 ml of toluene (first class grade chemicals manufactured by Wako Pure Chemical Industries, Ltd.) and 13.4 g of 3-methoxypropylamine (first class grade chemicals manufactured by Wako Pure Chemical Industries, Ltd., number of carbon atoms: 4, log P: −0.5) were mixed and sufficiently stirred with a magnetic stirrer (molar ratio of the added amine being 2.5 to the silver). While stirring, 10 g of silver nitrate (special grade chemicals manufactured by Toyo Chemical Industrial Co., Ltd.) was added into this mixture, and after the silver nitrate was dissolved, 10 g of DISPERBYK-111 and 10 g of hexanoic acid (special grade chemicals manufactured by Wako Pure Chemical Industries, Ltd.) were added. Thereto a 0.02 g/ml of sodium borohydride solution prepared by adding 1 g of sodium borohydride (manufactured by Wako Pure Chemical Industries, Ltd.) into 50 ml of ion-exchanged water was instilled into this mixture, and a liquid containing fine silver particles was obtained. After stirring for one hour, 200 ml of methanol (special grade chemicals manufactured by Wako Pure Chemical Industries, Ltd.) was added, and the silver particles were agglomerated and precipitated. In addition, after the fine silver particles were completely precipitated with centrifugal separation, toluene and methanol, which are supernatants, were removed and excess organic substances were removed, and added 9.5 g of isobutanol containing 0.5 g of SOLSPERSE190 (manufactured by The Lubrizol Corporation) to obtain a fine silver particle dispersion 2. The dispersion was evaluated in the same manner as in Example 1, and the obtained results are shown in Table 2.

Example 16

8.9 g of 3-methoxypropylamine (first class grade chemicals manufactured by Wako Pure Chemical Industries, Ltd., number of carbon atoms: 4, log P: −0.5) and 0.3 g of DISPERBYK-111 of a polymer dispersant were mixed and sufficiently stirred with a magnetic stirrer to prepare an amine mixture (molar ratio of the added amine being 5 to the silver). Next, 3.0 g of silver oxalate was added while stirring. After adding the silver oxalate, the silver oxalate was converted to a viscous white substance by continuing the stirring at room temperature, the stirring was finished at the time when the change was terminated in view of appearance (first step).

The thus obtained mixture was transferred to an oil bath, and stirred with heating at 120° C. Just after the stirring, a reaction started with generation of carbon dioxide, and thereafter, the stirring was continued until the generation of the carbon dioxide was terminated to obtain a suspension where the fine silver particles were suspended in the amine mixture (second step).

Next, in order to displace the dispersing medium of the suspension, after adding 10 mL of a mixed solvent of methanol/water and stirring, the fine silver particles were separated by precipitating with a centrifugal treatment, and 10 mL of a mixed solvent of methanol/water was added again, and after subjected to stirring and separating with the centrifugal treatment, added 3.0 g of isobutanol containing 0.06 g of SOLSPERSE41000 (manufactured by The Lubrizol Corporation) to obtain a fine silver particle dispersion 3. The dispersion was evaluated in the same manner as in Example 1, and the obtained results are shown in Table 3.

Example 17

A fine silver particle dispersion 4 was obtained in the same manner as in Example 16 except that 0.3 g of DISPERBYK-102 was introduced instead of DISPERBYK-111. The dispersion was evaluated in the same manner as in Example 1, and the obtained results are shown in Table 3.

Example 18

A fine silver particle dispersion 5 was obtained in the same manner as in Example 17 except that 7.5 g of 2-methoxyethylamine (first class grade chemicals manufactured by Wako Pure Chemical Industries, Ltd., number of carbon atoms: 3, log P: −0.9) (molar ratio of the added amine being 5 to the silver) instead of 3-methoxypropylamine, 0.3 g of TEGO Dispers655 (manufactured by Evonik Co., Ltd.) was used instead of DISPERBYK-102, the amount of SOLSPERSE41000 was 0.08 g, and methanol was used instead of ethanol. The dispersion was evaluated in the same manner as in Example 1, and the obtained results are shown in Table 3.

Com. Example 1

Fine silver particles 14 were obtained in the same manner as in Example 6 except that 7.4 g of 1,3-propanediamine (first class grade chemicals manufactured by Wako Pure Chemical Industries, Ltd., number of carbon atoms: 3, log P: −1.4) (molar ratio of the added amine being 10 to the silver) instead of 3-methoxypropylamine. The dispersing medium was isobutanol. The obtained fine silver particles 14 were evaluated in the same manner as in Example 1, and the obtained results are shown in Table 2.

Com. Example 2

Fine silver particles 15 were obtained in the same manner as in Example 8 except that 5.5 g of pentylamine (first class grade chemicals manufactured by Wako Pure Chemical Industries, Ltd., number of carbon atoms: 5, log P: 1.5) (molar ratio of the added amine being 10 to the silver) instead of butylamine. The dispersing medium was ethanol. The obtained fine silver particles 15 were evaluated in the same manner as in Example 1, and the obtained results are shown in Table 2.

Com. Example 3

Fine silver particles 16 were obtained in the same manner as in Example 11 except that 10.1 g of hexylamine (first class grade chemicals manufactured by Wako Pure Chemical Industries, Ltd., number of carbon atoms: 6, log P: 2.1) (molar ratio of the added amine being 10 to the silver) instead of 3-methoxypropylamine. The dispersing medium was ethanol. The obtained fine silver particles 16 were evaluated in the same manner as in Example 1, and the obtained results are shown in Table 2.

Com. Example 4

A comparative fine silver particle dispersion 1 was obtained in the same manner as in Example 17 except that 7.4 g of 1,3-propanediamine (first class grade chemicals manufactured by Wako Pure Chemical Industries, Ltd., number of carbon atoms: 3, log P: −1.4) (molar ratio of the added amine being 5 to the silver) instead of 3-methoxypropylamine. The dispersion was evaluated in the same manner as in Example 1, and the obtained results are shown in Table 3.

Com. Example 5

A comparative fine silver particle dispersion 2 was obtained in the same manner as in Example 14 except that 13.0 g of pentylamine (first class grade chemicals manufactured by Wako Pure Chemical Industries, Ltd., number of carbon atoms: 5, log P: 1.5) (molar ratio of the added amine being 2.5 to the silver) instead of butylamine. The dispersion was evaluated in the same manner as in Example 1, and the obtained results are shown in Table 3.

Com. Example 6

A comparative fine silver particle dispersion 3 was obtained in the same manner as in Example 17 except that SOLSPERSE41000 was not added. The dispersion was evaluated in the same manner as in Example 1, and the obtained results are shown in Table 3.

Com. Example 7

A comparative fine silver particle dispersion 4 was obtained in the same manner as in Example 17 except that SOLSPERSE41000 was added at the synthesis of the fine silver particles. The dispersion was evaluated in the same manner as in Example 1, and the obtained results are shown in Table 3.

Com. Example 8

A comparative fine silver particle dispersion 5 was obtained in the same manner as in Example 16 except that SOLSPERSE41000 was not added. The dispersion was evaluated in the same manner as in Example 1, and the obtained results are shown in Table 3.

Com. Example 9

A comparative fine silver particle dispersion 6 was obtained in the same manner as in Example 16 except that SOLSPERSE41000 was added at the synthesis of the fine silver particles. The dispersion was evaluated in the same manner as in Example 1, and the obtained results are shown in Table 3.

TABLE 1

| | | Ex.1 | Ex. 2 | Ex. 3 | Ex. 4 | Ex. 5 | Ex. 6 | Ex. 7 | Ex. 8 |
|---|---|---|---|---|---|---|---|---|---|
| Short chain amine | Butylamine (logP 1.0) | ○ | — | — | — | — | ○ | — | ○ |
| | Pentylamine (logP 1.5) | — | — | — | — | — | — | — | — |
| | 1,3-Propanediamine (logP −1.4) | — | — | — | — | — | — | — | — |
| | 2-Methoxyethylamine (logP −0.9) | — | — | — | — | — | — | ○ | — |
| | 3-Methoxypropylamine (logP −0.5) | — | ○ | ○ | ○ | ○ | — | — | ○ |
| Polymer dispersant | DISPERBYK-102 | — | — | — | — | ○ | ○ | ○ | ○ |
| | DISPERBYK-190 | — | — | — | ○ | — | — | — | — |
| | DISPERBYK-2090 | ○ | — | — | — | — | — | — | — |
| | DISPERBYK-111 | — | ○ | ○ | — | — | — | — | — |
| | TEGO Dispers655 | — | — | — | — | — | — | — | — |
| | DISPARLON DA-375 | — | — | — | — | — | — | — | — |
| | Fine silver particle | 1 | 2 | 3 | 4 | 5 | 6 | 7 | 8 |
| | Dispersing property | Δ | ○ | ○ | Δ | ○ | Δ | ○ | ○ |
| | Solvent | 2-Pentanol | Iso-butanol | Iso-butanol | Ethanol | Ethanol | Hexanol | Ethanol | Ethanol |
| | Reducibility | Δ | ○ | ○ | Δ | ○ | Δ | ○ | Δ |
| | Volume resistivity μΩ cm | 11 ○ | 15 ○ | 11 ○ | 13 ○ | 8 ○ | 13 ○ | 9 ○ | 12 ○ |
| Weight loss (%) | Room temperature to 200° C. | 5 | 5 | 4 | 3 | 3 | 3 | 3 | 3 |
| | 200 to 500° C. | 5 | 7 | 5 | 5 | 3 | 5 | 3 | 4 |
| | Total | 10 | 12 | 9 | 8 | 6 | 8 | 6 | 7 |

TABLE 2

|  |  | Ex. 9 | Ex. 10 | Ex. 11 | Ex. 12 | Ex. 13 | Com. Ex. 1 | Com. Ex. 2 | Com. Ex. 3 |
|---|---|---|---|---|---|---|---|---|---|
| Short chain amine | Butylamine (logP 1.0) | — | — | ○ | — | — | — | — | — |
|  | Pentylamine (logP 1.5) | — | — | — | — | — | — | ○ | — |
|  | 1,3-Propanediamine (logP −1.4) | — | — | — | — | — | ○ | — | ○ |
|  | 2-Methoxyethylamine (logP −0.9) | ○ | — | — | ○ | — | — | — | — |
|  | 3-Methoxypropylamine (logP −0.5) | — | ○ | — | — | ○ | — | — | — |
| Polymer dispersant | DISPERBYK-102 | — | — | ○ | ○ | ○ | ○ | ○ | ○ |
|  | DISPERBYK-190 | — | — | — | — | — | — | — | — |
|  | DISPERBYK-2090 | — | — | — | — | — | — | — | — |
|  | DISPERBYK-111 | — | — | — | — | — | — | — | — |
|  | TEGO Dispers655 | ○ | — | — | — | — | — | — | — |
|  | DISPARLON DA-375 | — | ○ | — | — | — | — | — | — |
|  | Fine silver particle | 9 | 10 | 11 | 12 | 13 | 14 | 15 | 16 |
|  | Dispersing property | ○ | Δ | Δ | Δ | Δ | x | x | x |
|  | Solvent | Ethanol | Iso-butanol | Acetone | Ethanol | Ethanol | Iso-butanol | Ethanol | Ethanal |
|  | Reducibility | ○ | Δ | Δ | x | Δ | x | x | x |
|  | Volume resistivity μΩ cm | 9 ○ | 17 ○ | 19 ○ | 20 ○ | 18 ○ | Cannot evaluated | Cannot evaluated | Cannot evaluated |
| Weight loss (%) | Room temperature to 200° C. | 3 | 4 | 4 | 3 | 4 | 3 | 3 | 3 |
|  | 200 to 500° C. | 3 | 5 | 4 | 4 | 4 | 4 | 4 | 5 |
|  | Total | 6 | 9 | 8 | 8 | 8 | 7 | 7 | 8 |

TABLE 3

|  |  | Example | | | | | Comparative Example | | | | | |
|---|---|---|---|---|---|---|---|---|---|---|---|---|
|  |  | 14 | 15 | 16 | 17 | 18 | 4 | 5 | 6 | 7 | 8 | 9 |
| Short chain amine | Butylamine (logP 1.0) | ○ | | | | | | | | | | |
|  | Pentylamine (logP 1.5) | | | | | | | ○ | | | | |
|  | 1,3-Propanediamine (logP −1.4) | | | | | | ○ | | | | | |
|  | 2-Methoxyethylamine (logP −0.9) | | | | | ○ | | | ○ | ○ | ○ | ○ |
|  | 3-Methoxypropylamine (logP −0.5) | | ○ | ○ | ○ | | | | | | | |
| Polymer dispersant | DISPERBYK-2090 | ○ | | | | | | ○ | | | ○ | ○ |
|  | DISPERBYK-111 | | ○ | ○ | | | | | ○ | ○ | | |
|  | DISPERBYK-102 | | | | ○ | | ○ | | | | | |
|  | TEGO Dispers655 | | | | | ○ | | | | ○ | | ○ |
|  | SOLSPERSE4100 | | | | | | | | | | | |
| Late Addition | SOLSPERSE4100 | ○ | | ○ | ○ | ○ | ○ | ○ | | | | |
|  | DISPARLON DA-375 | | ○ | | | | | | | | | |
| Solvent | Methanol | | | | ○ | | | | | | | |
|  | Ethanol | | | ○ | | ○ | ○ | | ○ | ○ | | |
|  | Isobutanol | | ○ | ○ | | | | | | | ○ | ○ |
|  | 2-Pentanol | ○ | | | | | | ○ | | | | |
| Evaluation | Dispersing property | Δ | ○ | ○ | ○ | ○ | x | x | Oto Δ | Oto Δ | Oto Δ | Oto Δ |
|  | Reducibility (just after) | Δ | ○ | ○ | ○ | ○ | x | x | ○ | ○ | ○ | ○ |
|  | Reducibility (1 week after stability) | Δ | Δ | ○ | ○ | Δ | — | — | x | x | x | x |
|  | Volume resistivity @ 120° C. | 11 | 15 | 12 | 10 | 15 | Cannot evaluate | Cannot evaluate | 8 | 12 | 11 | 18 |

TABLE 3-continued

|  |  | Example | | | | | Comparative Example | | | | | |
| --- | --- | --- | --- | --- | --- | --- | --- | --- | --- | --- | --- | --- |
|  |  | 14 | 15 | 16 | 17 | 18 | 4 | 5 | 6 | 7 | 8 | 9 |
| Weight loss (%) | Room temperature to 200° C. | 5 | 3 | 5 | 3 | 4 | 3 | 3 | 3 | 3 | 5 | 5 |
|  | 200 to 500° C. | 5 | 5 | 5 | 4 | 5 | 5 | 5 | 4 | 6 | 4 | 5 |
|  | Total | 10 | 8 | 10 | 7 | 9 | 8 | 8 | 7 | 9 | 9 | 10 |
| Overall |  | Δ | Δ | ○ | ○ | Δ | x | x | x | x | x | x |

[Evaluation of Various Dispersing Properties]

The same evaluation of dispersing property as in Example 1 and a yield measurement were conducted by dispersing the fine silver particles 6 obtained in the same manner as in Example 5, and the results are shown in Table 4. The Yield is calculated by dividing the recovered amount of silver by the initial amount of silver.

TABLE 4

| Used colloid | Evaluation | Hexane | Toluene | Acetone | Hexanol | Iso-propyl alcohol |
| --- | --- | --- | --- | --- | --- | --- |
| Fine silver particle 5 | Dispersing property | Δ | ○ | ○ | ○ | ○ |
|  | Yield (%) | 40 | 85 | 69 | 98 | 98 |

From the results shown Table 1 and Table 4, it has been proved that, according to the present invention, good dispersing property can be obtained with respect to the high polar solvent. From Examples 12 to 13, it is more suitable that the short chain amine is added in an amount of 2 mol or more relative to 1 mol of the silver in the first step. Further, from the results shown in Table 2, it has been proved that the used of the partition coefficient log P is suitable within the scope of from −1.0 to 1.4. As shown in Comparative Example 1, when the log P is −1.0 or less, a dispersible particle cannot be prepared. As shown in Comparative Examples 2 and 3, when the amine having the log P of more than 1.4 is present in the system, the dispersing property to the high polar solvent is extremely lowered. These results show that in order to obtain the fine silver particle having a good dispersing property to the high polar solvent, the partition coefficient log P is −1.0 to 1.4. In the following Table 5, acid values and kinds of adsorbing group of the used dispersants are shown.

TABLE 5

| Dispersant | Effective component (%) | Acid value mgKOH/g | Amine value mgKOH/g | Adsorbing group |
| --- | --- | --- | --- | --- |
| DISPERBYK-102 | 99 | 102 | — | Phosphoric acid |
| DISPERBYK-190 | 40 | 10 | — | Comb-type carboxylic acid |
| DISPERBYK-2090 | 81 | 61 | — | Star-type carboxylic acid |
| DISPERBYK-111 | 95 | 129 | — | Phosphoric acid |
| TEGO Dispers655 | 99 | 190 | — | Phosphoric acid |
| DISPARLON DA-375 | 99 | 14 | — | Phosphoric acid |

From the results shown in Table 3, it has been found that the fine particle dispersion of the present invention is excellent in all evaluations of the dispersing property, the reducibility, the volume resistivity, and the weight loss. To the contrary, from Comparative Examples 4 and 5, if the log P is not within the determined range, the dispersion is inferior in the dispersing property and the reducibility to the solvent. Further, from the results of Comparative Example 6, even though the dispersing property and the reducibility (just after) are good, it has been found that the dispersion is inferior in the reducibility (1 week after stability) (namely, potentially lack in dispersing stability). Furthermore, according to Comparative Example 7, when the dispersant is added only at the synthesis of the fine silver particles, it has been found that the dispersion is inferior in the reducibility (1 week after stability).

The invention claimed is:

1. A fine silver particle dispersion, which comprises
   fine silver particles,
   a short chain amine having 5 or less carbon atoms and
   a highly polar solvent,
   wherein a partition coefficient log P of the short chain amine is −1.0 to 1.4 and
   wherein the short amine is an alkoxyamine.

2. The fine silver particle dispersion according to claim 1, which further comprises a dispersant having an acid value for dispersing the fine silver particles.

3. The fine silver particle dispersion according to claim 1, which further comprises a protective dispersant having an acid value.

4. The fine silver particle dispersion according to claim 1, wherein the highly polar solvent is an alcohol having 1 to 6 carbon atoms.

5. The fine silver particle dispersion according to claim 1, wherein the highly polar solvent is methanol, ethanol, iso-propyl alcohol or n-propyl alcohol.

6. The fine silver particle dispersion according to claim 2, wherein the acid value of the dispersant is 5 to 200.

7. The fine silver particle dispersion according to claim 2, wherein the dispersant has a functional group derived from a phosphoric acid.

8. The fine silver particle dispersion according to claim 3, wherein the acid value of the protective dispersant is 5 to 200.

9. The fine silver particle dispersion according to claim 3, wherein the protective dispersant has a functional group derived from a phosphoric acid.

10. A composition for bonding, which comprises the fine silver particle dispersion according to claim 1.

11. A fine silver particle, which comprises
an alkoxyamine having 5 or less carbon atoms which is adhered to at least a part of the surface of the particle, and
a partition coefficient log P of the alkoxyamine is −1.0 to 1.4.

12. A composition for bonding, which comprises the fine silver particle according to claim 11.

13. A method for producing a fine silver particle, which comprises
a first step for preparing a mixed liquid of a silver compound which is decomposed by reduction to produce a metal silver, and a short chain amine having a partition coefficient log P of −1.0 to 1.4,
a second step for reducing the silver compound in the mixed liquid to produce a fine silver particle where a short chain amine having 5 or less carbon atoms which is adhered to at least a part of the surface of the particle, and
a third step for adding and mixing a dispersant having an acid value for dispersing the fine silver particles.

14. The method for producing a fine silver particle according to claim 13, wherein the short chain amine is added in an amount of 2 mol or more relative to 1 mol of the metal silver in the first step.

\* \* \* \* \*